United States Patent [19]

Trobert

[11] 4,136,329
[45] Jan. 23, 1979

[54] ENGINE CONDITION-RESPONSIVE SHUTDOWN AND WARNING APPARATUS

[75] Inventor: Joseph F. Trobert, Sparta, N.J.

[73] Assignee: Transportation Logic Corporation, Wharton, N.J.

[21] Appl. No.: 796,370

[22] Filed: May 12, 1977

[51] Int. Cl.² .............................................. G08B 19/00
[52] U.S. Cl. .................................. 340/52 F; 340/53; 180/103 BF
[58] Field of Search .............. 340/52 F, 53; 307/10 R; 180/103

[56] References Cited
U.S. PATENT DOCUMENTS

| | | | |
|---|---|---|---|
| 3,602,207 | 8/1971 | Kilmer | 123/179 |
| 3,841,291 | 10/1974 | Ludewig et al. | 123/198 DB |
| 4,034,335 | 7/1977 | Harazoe et al. | 340/52 F |

Primary Examiner—Alvin H. Waring
Attorney, Agent, or Firm—Martha G. Pugh

[57] ABSTRACT

Apparatus for use in conjunction with a vehicular engine, such as a large truck Diesel engine. The apparatus includes sensing elements responsive to respective engine operating conditions for providing signals when the respective conditions are adverse to the proper operation of the engine. When such a signal is generated, two things occur. First, a warning indication is given to the driver of the vehicle. Second, a timer is started. At the termination of the timing interval, the engine is disabled. This allows the driver of the vehicle time to pull it off the road in the event an engine malfunction occurs. There is further provided an override switch, the momentary operation of which restarts the timer in order to give the driver additional time.

21 Claims, 9 Drawing Figures

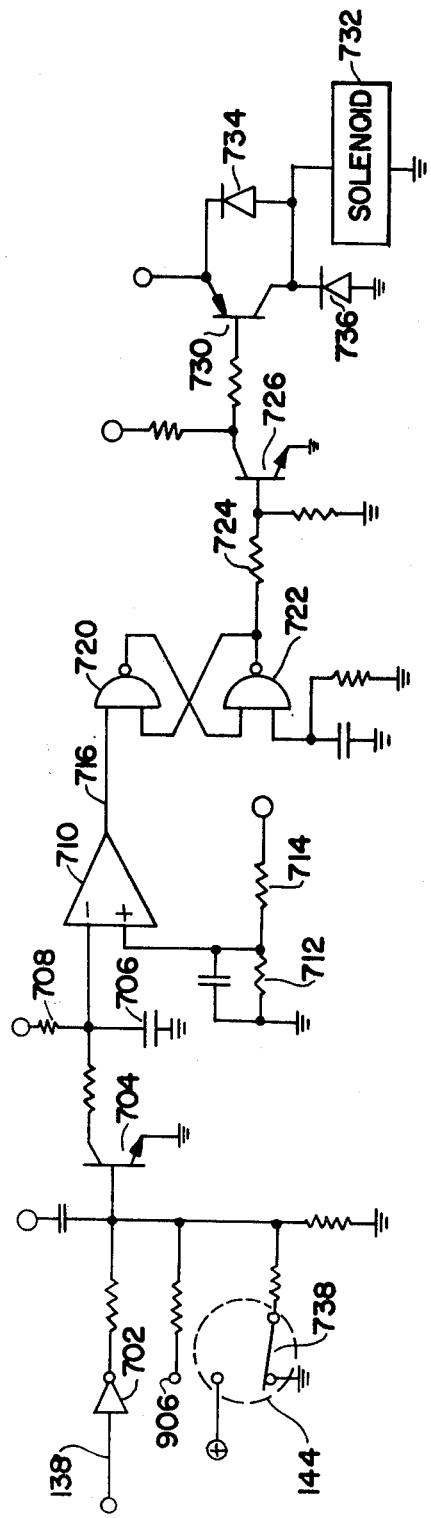
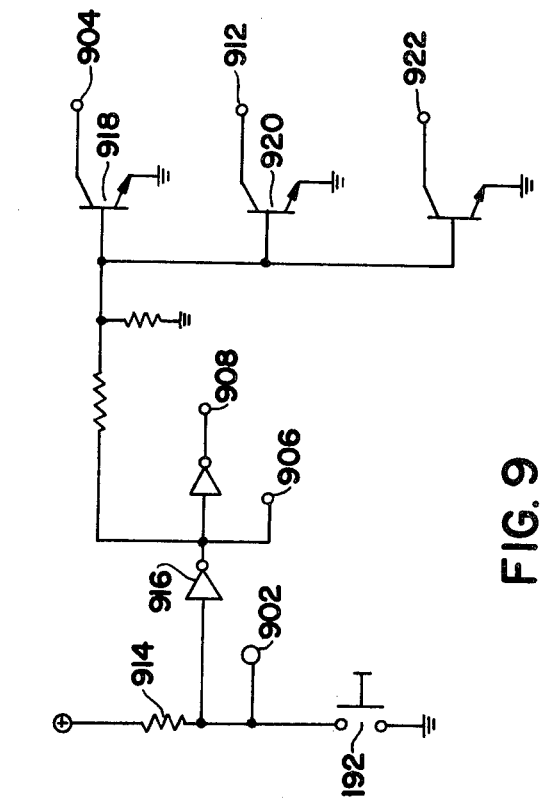
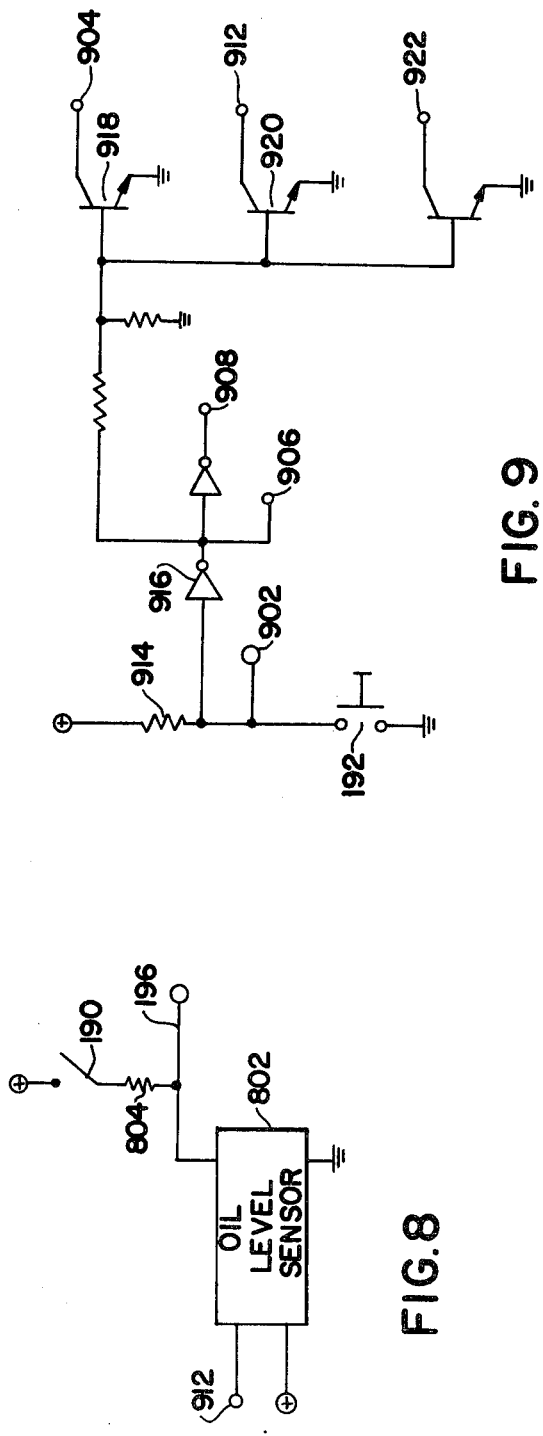
FIG. 7
FIG. 8
FIG. 9

ENGINE CONDITION-RESPONSIVE SHUTDOWN AND WARNING APPARATUS

BACKGROUND OF THE INVENTION

This invention relates to automotive control systems and, more particularly, to condition responsive apparatus for providing an indication of engine malfunction and disabling the engine in the event of such malfunction.

In the past, systems have been devised which shut down engine operation or motor vehicles whenever an adverse operating condition is detected, such as, for example, excessively low engine oil pressure or excessively high engine or transmission temperature. Such systems are particularly well suited for large trucks which typically have very expensive engines. The systems can prevent serious damage to, or total loss of, an engine which would occur if the driver failed to note the presence of the adverse condition from his dashboard instruments, or if the instruments were defective or gave inaccurate readings. Some of these systems suffer from the drawback that the engine is shut down without advance warning, thereby providing a safety hazard to both the driver of the vehicle and to those in close proximity to the vehicle. To overcome this disadvantage, systems have been proposed which permit restarting of the engine and at least brief subsequent operation. While an improvement, this is not entirely satisfactory as the engine has already been shut down. Other systems provide a warning to the driver that the engine will be shut down after some predetermined interval in order to allow the driver time to maneuver the vehicle off the road or to some safe location. This, too, is not entirely satisfactory as the driver might have no safe location to which he can move the vehicle within the allotted time interval. Further systems have been proposed which allow the driver to operate a switch and as long as the switch is operated, the shutdown system is overridden. This, too, is not entirely satisfactory in that the driver must maintain the switch operated and loses a certain amount of dexterity by being forced to operate the switch. In particular, the driver loses the use of one hand. It is, therefore, apparent that a need exists for an improved engine warning and shutdown system.

It is, therefore, an object of the present invention to provide apparatus responsive to adverse engine operating conditions for automatically effecting shutdown of the engine.

It is another object of the present invention to provide such apparatus which gives a warning to the driver and delays the engine shutdown for a predetermined interval.

It is a further object of the present invention to provide such apparatus wherein the driver may override the automatic shutdown operation.

It is still another object of this invention to provide such apparatus wherein the override feature does not require the driver to continuously activate the override function.

It is yet another object of this invention to provide such apparatus which is not sensitive to momentary failures, but rather requires the persistence of an adverse operating condition to effect engine shutdown.

SUMMARY OF THE INVENTION

The foregoing and additional objects are attained in accordance with the principles of this invention by providing apparatus for disabling an engine in response to adverse operating conditions. The apparatus comprises a plurality of sensing means coupled to the engine. Each of the sensing means is responsive to a respective engine operating condition to provide a signal whose value is indicative of the condition. A plurality of threshold detecting means are coupled to each receive the signal from a respective one of the sensing means and provide a respective adverse condition signal when the associated sensing means signal is within a range which indicates that the respective engine operating condition is adverse. Display means responsive to the adverse condition signal provides an indication that such condition is adverse. Timing means are provided and coupled to the threshold detecting means so as to be responsive to the presence of an adverse condition signal for timing a predetermined interval. Manually operable switch means are provided, the momentary closure of which causes the restarting of the timing means. Disabling means are provided for disabling the engine when the timing means completes timing the predetermined interval.

DESCRIPTION OF THE DRAWINGS

The foregoing will be more readily apparent upon reading the following description in conjunction with the drawings in which like reference numerals in different figures denote like elements and wherein:

FIG. 7 depicts illustrative circuitry for disabling the engine a predetermined time after the detection of an adverse operating condition;

FIG. 8 depicts illustrative circuitry for detecting low engine oil level; and

FIG. 9 depicts illustrative circuitry for generating signals to test the system operation.

DESCRIPTION OF THE PREFERRED EMBODIMENT

Figure 1:
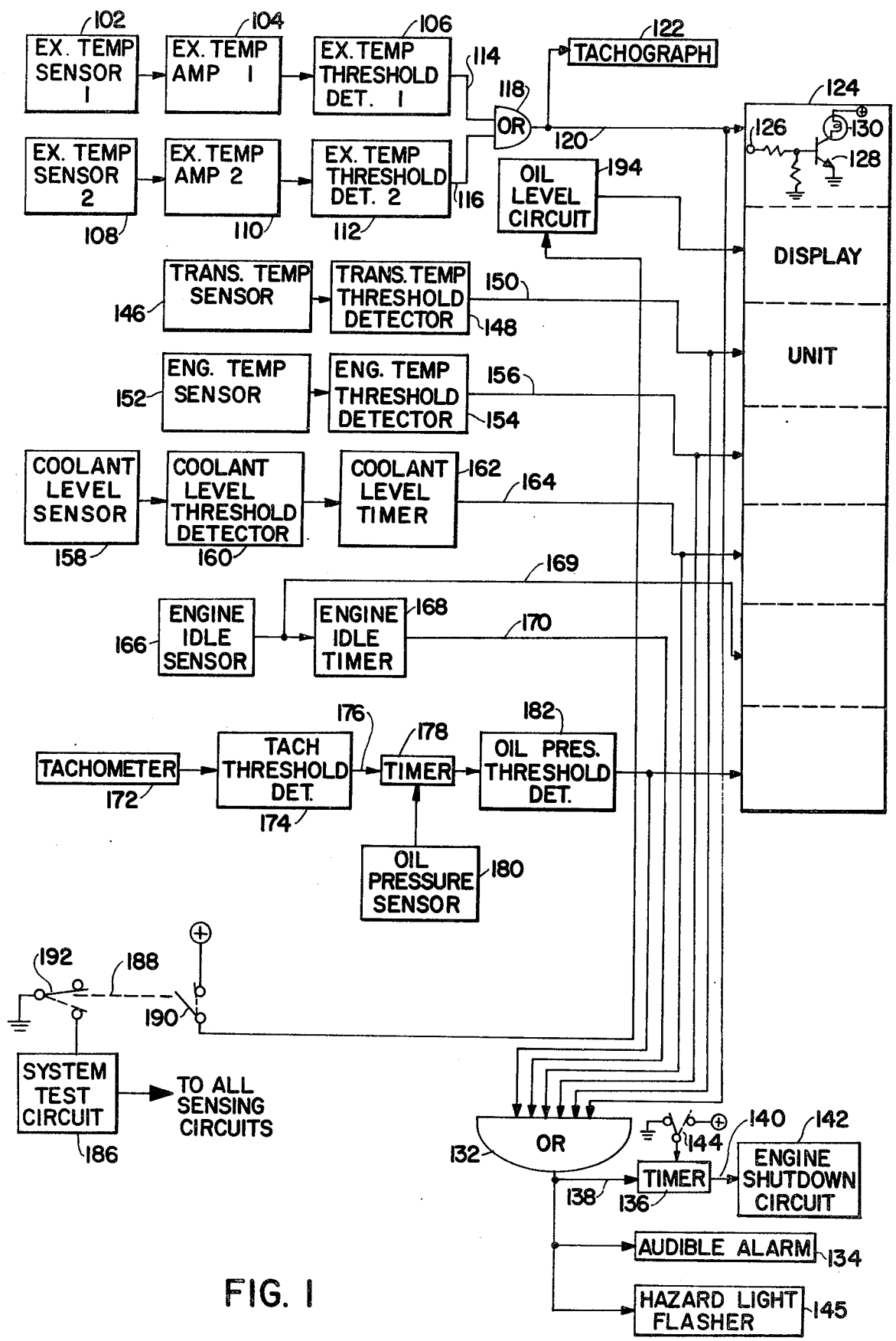
FIG. 1 depicts an overall block schematic diagram of apparatus constructed in accordance with the principles of this invention.

Referring now to FIG. 1, depicted therein is a block diagram of apparatus constructed in accordance with the principles of this invention. The apparatus comprises a plurality of sensing elements coupled to provide signals indicative of respective operating conditions of the engine being monitored. As shown in FIG. 1, the particular conditions are exhaust temperature, transmission temperature, engine temperature, coolant level, oil level, engine idle time, and oil pressure. In large trucks, there may be two exhausts. Therefore, the apparatus shown in FIG. 1 shows exhaust temperature monitoring for two channels, the monitoring circuitry for the two channels being identical.

As shown in FIG. 1, exhaust temperature sensor number 1, indicated by the reference numeral 102, is connected to exhaust temperature amplifier 104. The output of amplifier 104 is connected to exhaust temperature threshold detector 106. Similarly, for the second exhaust system of the engine, exhaust temperature sensor 108 is connected to exhaust temperature amplifier 110 which in turn is connected to exhaust temperature threshold detector 112. The outputs of exhaust temperature threshold detectors 106 and 112 are connected via their output terminals 114 and 116, respectively, to the inputs of OR gate 118. As will be described in more detail hereinafter with reference to FIG. 2, when either of the two exhaust temperature sensors 102 and 108 indicates an adversely high exhaust temperature, a signal is presented at the output 120 of OR gate 118. The signal on lead 120 is coupled to three different circuits. First, lead 120 is connected to tachograph 122. A tachograph is a recorder typically mounted in the truck. The tachograph records at what time of day the vehicle starts and stops, distance traveled, speed and revolutions per minute (RPM) of the engine. Tachographs are also available with an event stylus which may be connected to be operated by a predetermined signal. Lead 120 is connected to the energizing lead for the event stylus of tachograph 122. Whenever the exhaust temperature exceeds a predetermined level, the signal on lead 120 causes the event stylus in tachograph 122 to put a mark on the tachograph chart. It is understood that adverse conditions other than high exhaust temperature may be monitored via tachograph 122. For example, the occurrence of excessive engine speed could trigger the event stylus.

Lead 120 is also connected to display unit 124. Display unit 124 comprises a plurality of indicating lamps and driver circuitry. Lead 120 is connected to terminal 126. With a high signal at terminal 126, indicating an adverse exhaust temperature, transistor 128 is turned on, thereby allowing current to flow through lamp 130. Lamp 130 is associated on the display unit with the exhaust temperature condition. Illustratively, display unit 124 comprises seven lamps and associated driving circuitry, each of which is identical to that just described, but each of which is cobnected to receive different adverse operating condition signals.

Lead 120 is also connected to the input of OR gate 132, as are the outputs of all the other monitoring circuits. The output of OR gate 132 is connected to audible alarm circuit 134 and timer 136. Audible alarm circuit 134 contains driver circuitry illustratively identical to the driver circuitry described with reference to display unit 124, except that an audible alarm device, such as a loud buzzer, replaces lamp 130. Timer 136 is responsive to an output signal on 138 from OR gate 132 to time a predetermined interval. Illustratively, this interval may be thirty seconds. It has been found that, in general, a thirty second time interval is sufficient to allow the driver of the truck to maneuver the vehicle to a safe location in the event of an adverse operating condition. At the end of the thirty second (or other suitable time period) interval, timer 136 places an output signal on lead 140 to engine shutdown circuit 142 which operates to disable the vehicle by shutting down the engine. At this point, it should be noted that the driver of the vehicle has been alerted to an adverse operating condition by the sounding of audible alarm 134. The driver may then glance at display unit 124 to determine which condition in particular has been sensed to be adverse. The driver, knowing his particular vehicle, may choose to ignore the indication of an adverse cnndition. Alternatively, the vehicle may be so disposed in traffic or otherwise that the driver recognizes that he will not be able to maneuver the vehicle to a safe location within the allotted time interval. Therefore, there is provided manual override switch 144 which is connected to normally apply a ground to timer 136. In the event the driver wishes to temporarily ignore the alarm, he may then momentarily move switch 144 to apply a positive voltage to timer 136, as indicated by the dashed line position of switch 144. This momentary application of a positive voltage level to timer 136 restarts the timing interval and allows the driver to have additional time within which either the condition goes away or the vehicle is brought to a safe location. The output of OR gate 132 may also be connected to activate hazard light flasher 145 of the vehicle so that other drivers may be made aware of trouble with the vehicle.

The transmission temperature of the vehicle is sensed by transmission temperature sensor 146 whose output is connected to transmission temperature threshold detector 148. The output of transmission temperature threshold detector 148 applies a high signal to lead 150 when the transmission temperature exceeds a safe operating level. This signal is coupled to associated driver circuitry within display unit 124 and to OR gate 132 where it causes the performance of the same functions as previously described for the exhaust temperature.

Engine temperature is sensed by engine temperature sensor 152. The output of engine temperature sensor 152 is connected to engine temperature threshold detector 154 which places a high signal on lead 156 when the engine temperature exceeds a safe operating level. The engine temperature monitoring circuitry operates identically to that of the transmission temperature monitoring circuitry, with lead 156 being connected to display unit 124 and OR gate 132.

The engine coolant level is sensed by coolant level sensor 158 whose output is connected to coolant level threshold detector 160. The output of coolant level threshold detector 160 is coupled to coolant level timer 162. The purposes of having coolant level timer 162 is to avoid engine shutdown in the event of a temporary coolant level variation. If the coolant level remains low for more than a predetermined time, as determined by coolant level timer 162, an output signal is applied to lead 164, which lead is coupled to display unit 124 and OR gate 132 to effect the performance of the aforedescribed warning and shutdown functions.

Engine idle sensor 166 provides a signal to engine idle timer 168 whenever the vehicle engine is running and the vehicle is standing. As will be described in more detail hereinafter, engine idle sensor 166 is responsive to the vehicle parking brake being activated. Whenever the engine is idling, a signal is applied over lead 169 to display unit 124. If the engine idles for more than a predetermined time, as determined by engine idle timer 168, a signal is applied to lead 170 which is connected to OR gate 132.

Low oil pressure is only a cause for concern when the engine is operating above a predetermined speed. To sense the occurrence of low oil pressure above that speed, tachometer 172 is coupled to tachometer threshold detector 174. When tachometer threshold detector 174 senses engine operation above a predetermined speed, it presents a signal on lead 176 to initiate timing by timer 178. Oil pressure switch 180 is conditioned to inhibit timer 178 when the oil pressure is at a safe level and to enable timer 178 when the oil pressure is below the safe level. Therefore, timer 178 only performs its timing function upon the simultaneous occurrence of engine operating speed above a predetermined level and oil pressure below a safe level. When timer 178 times out, it sends a signal to oil pressure threshold detector 182 which provides an output signal on lead 184 in the event that the oil pressure is below the safe operating level when the engine operating speed is greater than the predetermined speed. The signal on lead 184 is coupled to display unit 124 and OR gate 132.

System test circuit 186 is provided to generate signals for testing the system. The test function is initiated by operating switch 188. Switch 188 includes switch contact 190 and switch contact 192. Switch 188 is arranged so that contact 190 closes before contact 192 closes. The closure of contact 190 provides a voltage to oil level circuit 194 which checks the oil level and presents a signal on lead 196 to display unit 124 when the oil level is within a safe range. This is typically done before the engine is turned on. The subsequent closure of switch contact 192 causes system test circuit 186 to generate the signals for testing the system, as will be described in more detail hereinafter will reference to FIG. 9.

EXHAUST TEMPERATURE MONITOR

Figure 2:
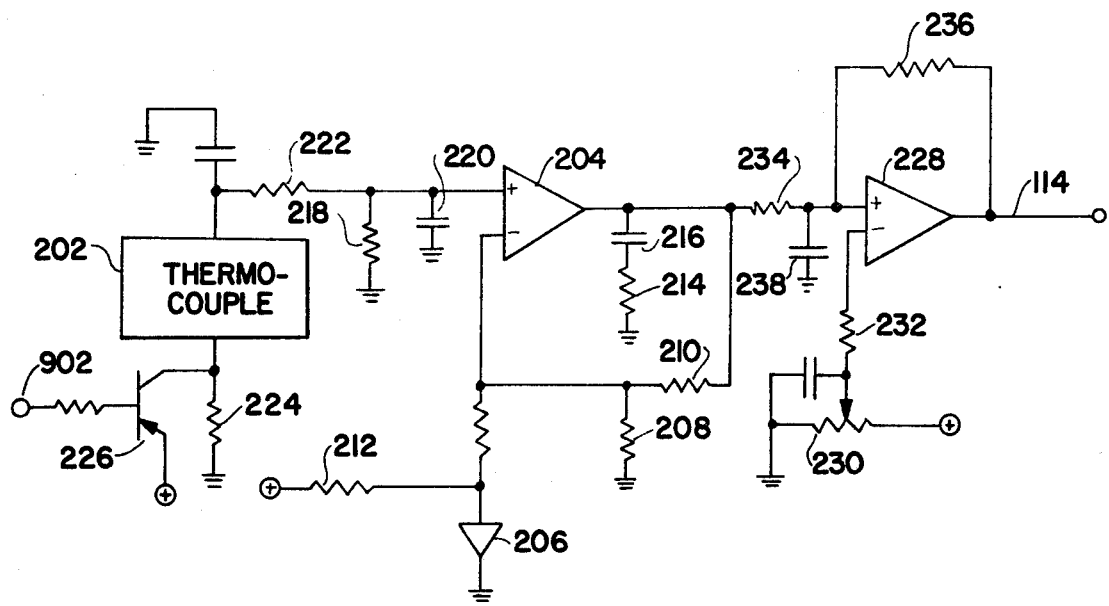
FIG. 2 depicts illustrative circuitry for detecting excessive exhaust temperature.

Referring now to FIG. 2, shown therein is illustrative circuitry for monitoring engine exhaust temperature. The temperature sensor comprises thermocouple 202 which is illustratively an alumel-chromel thermocouple. In the circuitry shown in FIG. 2, amplifier 204 operates as a linear amplifier, amplifying inputs from thermocouple 202 and compensating diode 206. Resistors 208 and 210 determine the gain of amplifier 204. Resistor 212 determines the proper bias for compensating diode 206. Resistor 214 and capacitor 216 provide frequency compensation and resistor 218 and capacitor 220 form a noise reducing network. Resistor 222 provides isolation and resistor 224 functions as a load resistor for test transistor 226.

Thermocouple 202 is mounted in the exhaust manifold of the engine. As the exhaust temperature increases, the output voltage of thermocouple 202 increases and this increase is amplified by amplifier 204 and applied as an input to comparator 228. Comparator 228 functions in a digital manner and provides a high voltage on lead 114 when the exhaust temperature is above a threshold temperature which is set by potentiometer 230. Resistors 232 and 234 are used for bias compensation and isolation, respectively. Resistor 236 is used for hysteresis to eliminate isolation about the threshold point of comparator 228 and capacitor 238 is for the purpose of noise elimination.

As the exhaust temperature changes, an error voltage is developed due to the junction of thermocouple 202 and the electronics shown in FIG. 2. Diode 206 is calibrated to yield an equal change in voltage which is added in opposite polarity to the error voltage, thereby cancelling it out. During the system test function, a low signal is applied to terminal 902 from system test circuit 186 to turn on transistor 226. When transistor 226 is turned on, it injects a signal through thermocouple 202 into amplifier 204. This signal is larger in magnitude than the signal provided by thermocouple 202 in response to the threshold exhaust temperature, thereby energizing the entire monitoring circuit and causing a high signal to be applied to lead 114, which signal is utilized to light the associated display lamp in display unit 124 and to sound the audible alarm 134.

ENGINE AND TRANSMISSION TEMPERATURE MONITORING

Figure 3:
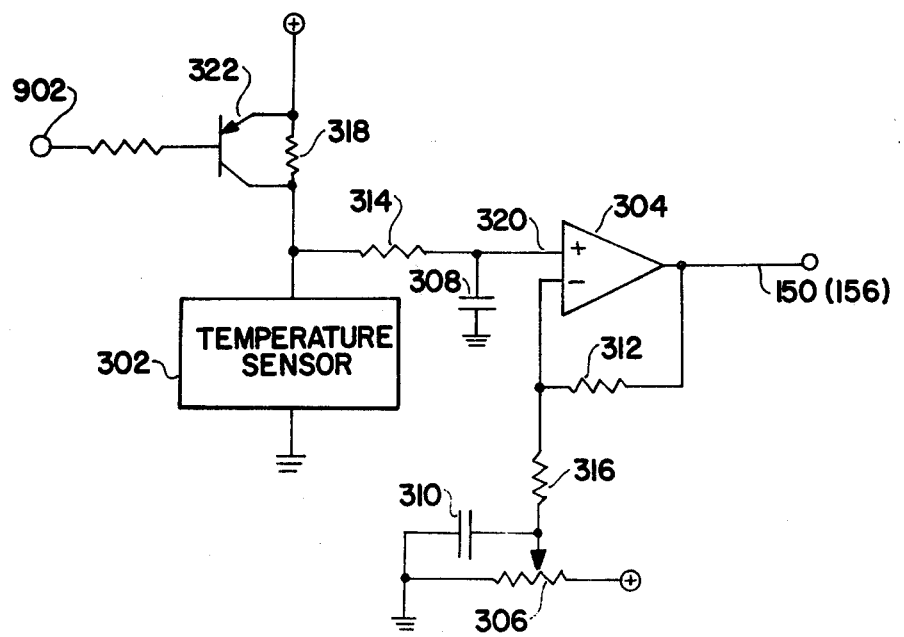
FIG. 3 depicts illustrative circuitry for detecting excessive engine or transmission temperature.

Referring now to FIG. 3, shown therein is illustrative circuitry which may be utilized for monitoring the engine or transmission temperature of the vehicle. Temperature sensor 302 is illustratively a one-half watt nickel wire-wound resistor which has large linear resistance changes in response to the temperature of its environment. As the temperature goes up, the resistance increases. For monitoring the engine temperature, the sensor is mounted in the water jacket at the top of the engine and for measuring the transmission temperature, the sensor is mounted in the transmission fluid. Amplifier 304 is used as a comparator with potentiometer 306 setting the threshold level. Capacitors 308 and 310 are used for decoupling and noise immunity. Resistor 312 is used for hysteresis purposes to eliminate isolation about the threshold point of amplifier 304. Resistor 314 is used for isolation and resistor 316 is used for bias compensation. Resistor 318 in conjunction with temperature sensor 302 determines the bias of the circuit. As the temperature increases, the resistance of temperature sensor 302 increases and the voltage at input 320 of amplifier 304 begins to rise. When the temperature exceeds a predetermined threshold, comparator 304 provides a high signal on output lead 150, (or 156), which is coupled to display unit 124 and OR gate 132. For testing the circuitry, a low voltage is applied to terminal 902 from the system test circuit 186, which turns on transistor 322, changing the bias point of the circuitry. The input voltage to amplifier 304 on lead 320 becomes higher than the threshold, thereby simulating a high temperature malfunction.

COOLANT LEVEL MONITORING

Figure 4:
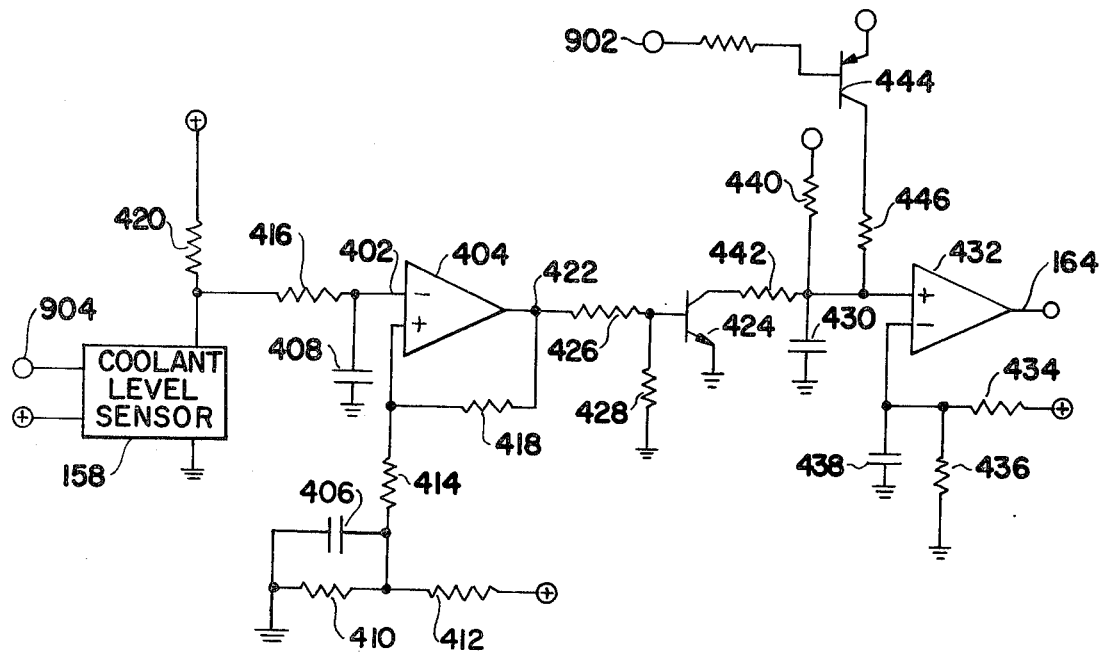
FIG. 4 depicts illustrative circuitry for detecting low coolant level.

Referring now to FIG. 4, shown therein is illustrative circuitry for monitoring the coolant level. Coolant level sensor 158 illustratively uses a high frequency oscillator in a bridge circuit to detect changes in impedance with and without coolant. With coolant level sensor 158 immersed in coolant of sufficient level, an input voltage is present on lead 402 to amplifier 404 of approximately 0.4 volts, which is below the threshold voltage of the circuit. Amplifier 404 is configured as a comparator. Capacitor 406 is for decoupling and capacitor 408 is for noise immunity. Resistors 410 and 412 determine the threshold level of the circuit. Resistor 414 provides bias compensation and resistor 416 is for purposes of isolation. Resistor 418 is for hysteresis to avoid isolation about the threshold point of amplifier 404. Resistor 420 in conjunction with coolant level sensor 158 determines the proper bias point of the circuit.

With the 0.4 volt signal on lead 402, indicating sufficient coolant level, the output of amplifier 404 on lead 422 is high, turning on transistor 424 through the biasing network comprising resistors 426 and 428. Capacitor 430 is held at about 0.4 volts and the output of comparator 432 on lead 164 is held low. Resistors 434 and 436 determine the threshold point for comparator 432. Capacitor 438 is used for noise immunity. When the coolant level is insufficient, the output of coolant level sensor 158 causes the input to comparator 404 on lead 402 to go above the threshold point. The output of comparator 404 on lead 422 then goes low, turning off transistor 424, initiating operation of the timing network comprising resistor 440 and capacitor 430, causing capacitor 430 to begin to charge. If the coolant level returns to normal before the time delay of the timing circuit has elapsed, transistor 424 is again turned on, discharging capacitor 430 through resistor 442 and transistor 424. The remainder of the system is not aware that even a temporary coolant level variation has occurred. However, if the coolant level remains low beyond the predetermined time, capacitor 430 charges above the threshold of comparator 432. In such case, a high signal is applied to lead 164, which lead is connected to display unit 124 and OR gate 132.

During the test mode, coolant level sensor 158 is energized by system test circuit 186 applying a low signal to terminal 904. Additionally, a low signal is applied to terminal 902, turning on transistor 444 to charge capacitor 430 through resistor 446 in addition to resistor 440 and thereby reduce the charge time so that the display is essentially instantaneous.

Alternatively, coolant level sensor 158 may be an inactive conductive probe device. The conductive probe approach presently has the problem of causing electrolysis within the cooling system. Efforts are being made by radiator manufacturers to solve this problem. When this problem is solved, the conductive probe approach would provide an inactive circuit design, rather than the active circuit design for the sensor described above. The input circuitry to comparator 404 would then be similar to the input circuitry for comparator 304, discussed above with reference to FIG. 3.

IDLE MONITOR

Figure 5:
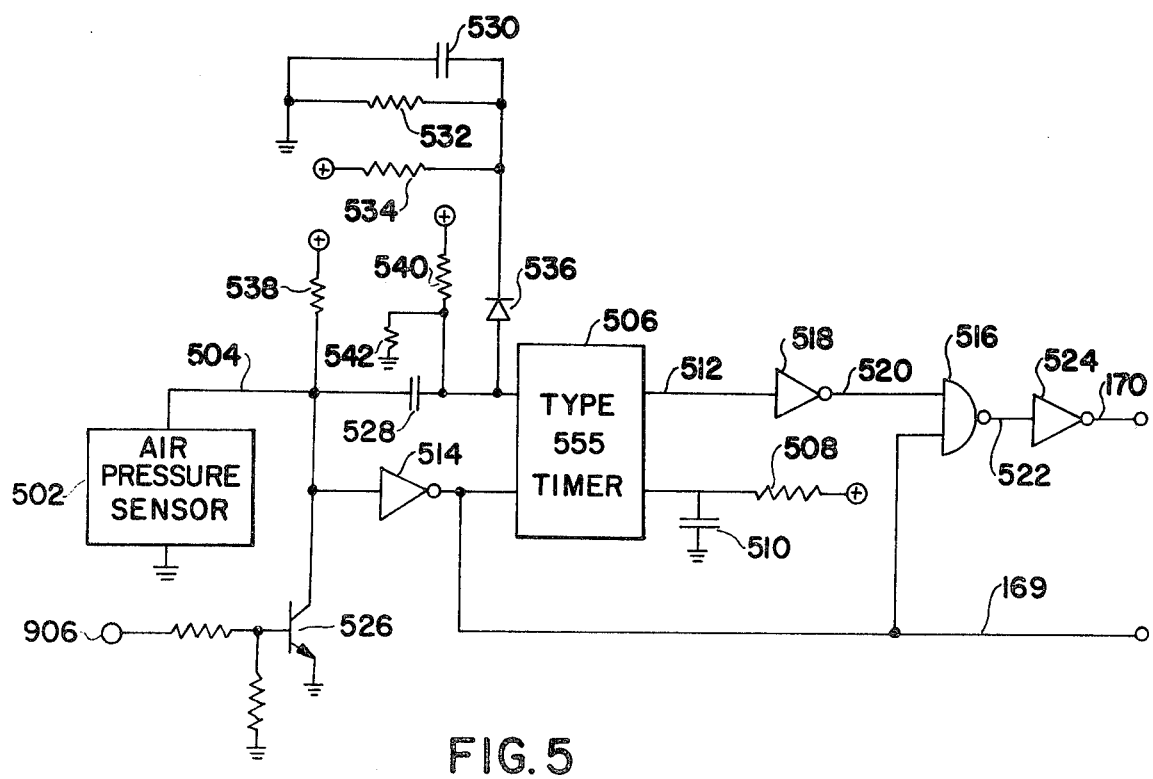
FIG. 5 depicts illustrative circuitry for detecting excessive engine idling time.

Referring now to FIG. 5, shown therein is circuitry for monitoring when the engine is idling and providing a signal to shut down the engine after a predetermined idle period. To determine that the engine is idling, air pressure sensor switch 502 is provided. Sensor 502 is mounted to receive pressure from the air brakes of the vehicle. When the operator of the vehicle engages the parking brake of the vehicle, air pressure therein causes the contacts within air pressure sensor switch 502 to close. This places a ground signal on lead 504.

Timer 506 is illustratively a type 555 integrated circuit timer whose timing period is determined by the component values chosen for resistor 508 and capacitor 510. Illustratively, with resistor 508 chosen to be 11 megohms and capacitor 510 chosen to be 47 microfarads, timer 506 will provide a high signal on lead 512 for approximately 9½ minutes. With resistor 508 chosen to be 10 megohms and capacitor 510 chosen to be 39 microfarads, the high signal on lead 512 will last for approximately seven minutes. Other values for resistor 508 and capacitor 510 may be chosen dependent upon the maximum desired duration for engine idling. The ground signal on lead 504 initiates the timing function of timer 506. This ground on lead 504 (a low logic level) is inverted by inverter 514 to put a high signal on lead 169 for as long as the parking brake of the vehicle is actuated. The high signal on lead 169 is coupled to light the appropriate lamp in display unit 124 and also partially enables NAND gate 516. At the end of the timing period, the signal on lead 512 goes low, and is inverted by inverter 518 to provide a high signal on lead 520. If the engine is still idling, as determined by a high signal on lead 169, at this time, NAND gate 516 provides a low signal on lead 522 which is inverted by inverter 524 to provide a high signal on lead 170 which is connected to OR gate 132, thereby initiating the engine shutdown circuitry. If the parking brake is released during the time period determined by timer 506, timer 506 is reset and no adverse operating condition signal is produced on lead 170.

A high signal applied to terminal 906 from the system test circuit 186 causes transistor 526 to be turned on, simulating closure of air pressure sensor switch 502, thereby exercising the idle monitoring circuitry.

Capacitor 528 AC couples the air pressure signal on lead 504 to timer 506. Capacitor 530, resistor 532, resistor 534 and diode 536 are utilized for power turn-on initiation. Resistors 538, 540 and 542 are utilized to provide bias voltage to the input of timer 506.

OIL PRESSURE MONITOR

Figure 6:
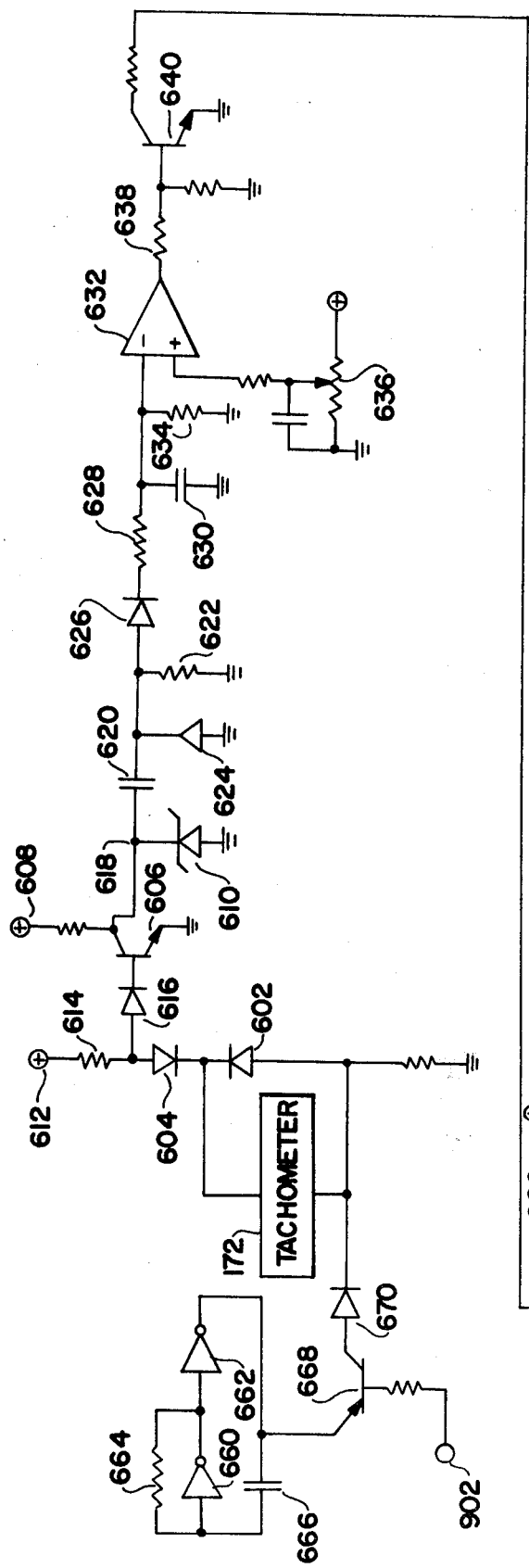
FIG. 6 depicts illustrative circuitry for detecting low oil pressure when the engine is operating above a predetermined speed.
Figure 6:
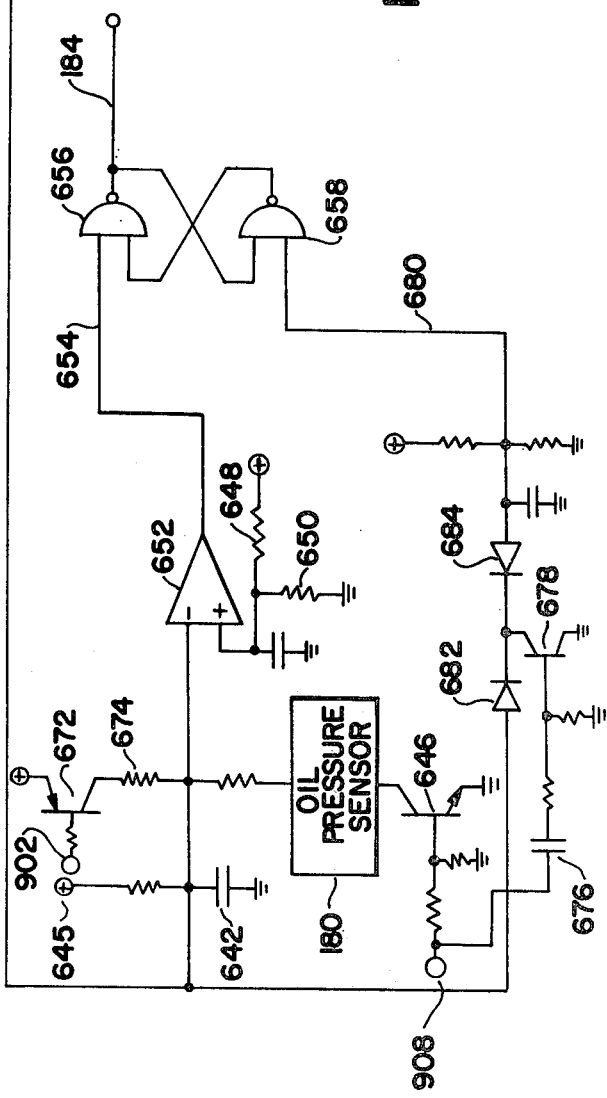
Figure 1:
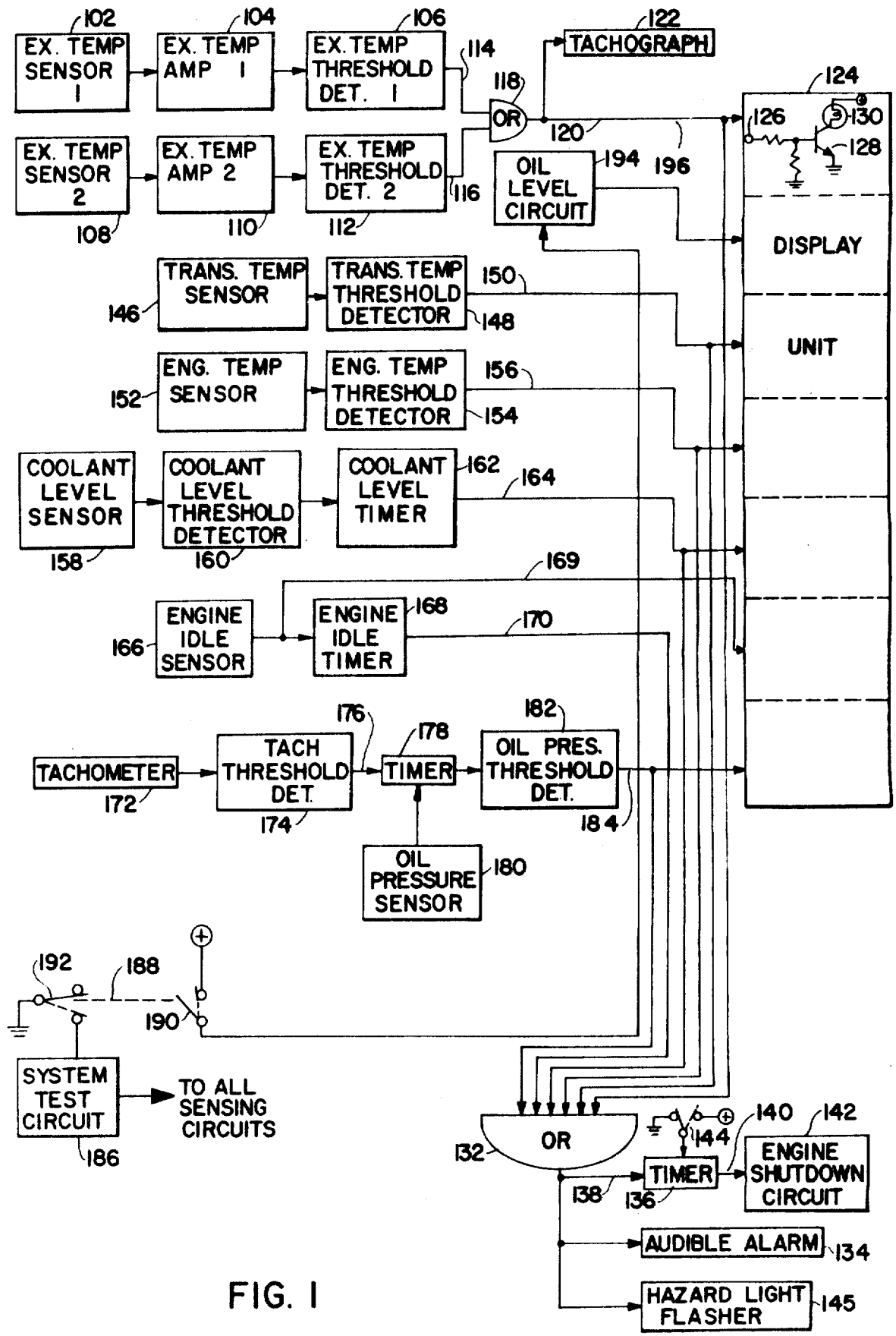

Referring now to FIG. 6, depicted therein is circuitry for monitoring the oil pressure and providing an adverse operating condition signal on lead 184 when the oil pressure drops below a predetermined value and the engine is operating above a predetermined value of RPM. This is accomplished by selectively charging a capacitor upon the simultaneous occurrence of the two above-mentioned conditions. A current source is connected to charge the capacitor when the speed of the engine is greater than 1800 RPM. An oil pressure sensor switch shorts the capacitor to ground to prevent its being charged when the oil pressure is above a predetermined low danger level, thereby allowing the capacitor to charge only upon the simultaneous occurrence of high speed and low oil pressure.

Tachometer pickup 172 provides an essentially sinusoidal signal across diode 602 which clamps large negative excursions thereof to prevent damage to the circuitry. Negative excursions of the tachometer signal allow diode 604 to conduct, thereby turning off transistor 606. The collector of transistor 606 attempts to rise toward the positive potential supplied by source 608, but is clamped to a lower voltage by zener diode 610. Positive excursions of the tachometer output signal back bias diode 604 and current flows from source 612 through resistor 614 and diode 616 into the base of transistor 606, thereby turning on transistor 606. The voltage at the collector of transistor 606 thereby goes low. Thus, the wave form on lead 616 is a constant amplitude square wave whose period is the same of that of the input sensor signal from tachometer 172.

Capacitor 620 and resistor 622 set up an appropriate system time constant for the speed range in question. Diode 624 serves as a clamp. Diode 626, resistor 628, and capacitor 630 perform peak detection. A DC voltage proportional to input speed therefore appears across capacitor 630, an input to comparator 632. Resistor 634 provides a discharge path for capacitor 630 as the speed of the engine decreases. Potentiometer 636 is utilized to provide a reference voltage corresponding to the desired engine speed above which low oil pressure is to be detected. When the voltage across capacitor 630 reaches the reference voltage set up by potentiometer 636, the output of comparator 632 on lead 638 goes low, thereby turning off transistor 640 which previously had been on.

When transistor 640 is turned off, capacitor 642 is allowed to charge through resistor 644 (which, together with source 645, acts as a current source) if and only if oil pressure sensor 180 is open, indicating low oil pressure. Capacitor 642 corresponds to timer 178 (FIG. 1).

Oil pressure sensor 180 is illustratively a pressure actuated switch which is normally open and closes its contacts when the oil pressure rises above 30 PSI. Normally, a high signal is applied to terminal 908 from system test circuit 186 so that transistor 646 is normally on. With the oil pressure above 30 PSI and transistor 646 turned on, capacitor 642 is shorted and does not charge. However, if the oil pressure is below 30 PSI and the speed of the engine is above 1800 RPM, capacitor 642 begins to charge.

When the voltage across capacitor 642 reaches the voltage set by the voltage divider comprising resistors 648 and 650, the output of comparator 652 on lead 654 goes low. Lead 654 is connected to the flip-flop comprising cross-coupled NAND gates 656 and 658. A low signal on lead 654 causes the flip-flop to be placed in a state wherein lead 184 has a high signal thereon. Lead 184 is connected to display unit 124 and OR gate 132. A high signal on lead 184 indicates low oil pressure and causes the above described display and engine shutdown function.

The flip-flop comprising cross-coupled NAND gates 656 and 658 can only be reset by a momentary power turnoff, thereby insuring that the system cannot be reset by a reduction in engine speed once the adverse operating condition has been detected.

Inverters 660 and 662, resistor 664 and capacitor 666 comprise an oscillator. Transistor 668 and diode 670 act as a switch. When a low signal is applied to terminal 902 from system test circuit 186, transistor 668 is turned on, thereby injecting the oscillator signal into the tachometer circuit. The frequency of oscillation is sufficiently high to cause comparator 632 to provide a low input at its output on lead 638, thereby turning off transistor 640 and removing one of the short circuits for capacitor 642. In the test mode, transistor 672 is also turned on by the low signal on lead 902. Therefore, capacitor 642 begins to charge, but with a reduced time constant due to resistor 674 being in parallel with resistor 644. Comparator 652 therefore provides a low signal on lead 654, thereby causing the flip-flop comprising cross-coupled NAND gates 656 and 658 to provide a high signal on lead 184. When the test button is released, capacitor 676 feeds a momentary signal to transistor 678 which provides a low signal on lead 680 to reset the flip-flop comprising cross-coupled NAND gates 656 and 658, thereby causing a low signal to return to lead 184. Diode 682 is utilized to discharge capacitor 642 upon the completion of the test. Without this discharge through diode 682 and transistor 678, capacitor 642 would remain charged if the test button were pushed during an idle situation where the oil pressure sensor switch 180 was open. Comparator 652 would maintain a low signal on its output lead 654 and the flip-flop comprising cross-coupled NAND gates 656 and 658 would remain in its set state with a high signal on its output lead 184, keeping the system in a failure mode. Diode 684 is used to isolate the reset mechanism of the flip-flop comprising cross-coupled NAND gates 656 and 658 from being activated upon discharge of capacitor 642 in situations other than during the test mode.

ENGINE SHUTDOWN

Referring now to FIG. 7, depicted therein is circuitry for timing the interval during which the driver has time to maneuver the vehicle to a safe location and the circuitry for effecting shutdown of the engine. Terminal 138 is coupled to the output of OR gate 132 and has a high signal impressed thereon whenever an adverse operating condition is detected. The high signal on lead 138 is inverted by inverter 702 to provide a low signal to turn off transistor 704. Transistor 704 is normally turned on, thereby shorting capacitor 706. When transistor 704 is turned off, capacitor 706 charges through resistor 708. Comparator 710 monitors the voltage across capacitor 706. When this voltage exceeds the threshold determined by resistors 712 and 714, the output of comparator 710 on lead 716 will go low. The time constant determined by the values of capacitor 706 and resistor 708 determines the "maneuver" time for the system. Illustratively, this time period is thirty seconds. If the adverse operating condition disappears before the charge on capacitor 706 exceeds the threshold value, transistor 704 will turn on, discharging capacitor 706 through resistor 718. If, however, the charge on capacitor 706 reaches the threshold value and the output of comparator 710 places a low signal on lead 716, the flip-flop comprising cross-coupled NAND gates 720 and 722 will be set, placing a low signal on lead 724. The low signal on lead 724 turns off transistor 726. With transistor 726 turned off, transistor 730 is turned off. Transistor 730 is the main switch controlling the engine. With transistor 730 on, solenoid 732 is energized. With transistor 730 turned off, solenoid 732 is de-energized, thereby disabling the engine, as will be described in more detail thereinafter. Diodes 734 and 736 are used for transient suppression.

In the test mode, a high signal is applied to terminal 906 by system test circuit 186, thereby keeping transistor 704 turned on so that no engine shutdown will occur during the test mode.

If the driver determines that he needs more than the preset maneuver time, switch 144, whose contact arm 738 is normally connected to ground, is momentarily operated to apply a high signal to the base of transistor 704, thereby turning it on and discharging capacitor 706, thereby restarting the timing interval when switch 144 is returned to its normal position.

Engine shutdown may be accomplished in several different ways, depending upon the particular engine. A first method is to open the 12 volt DC supply to the fuel solenoid, which immediately stops the engine. If this method were utilized, the solenoid 732 would be the fuel solenoid. The fuel solenoid itself is located on the engine and comes as standard equipment. The solenoid requires 12 volts DC to keep the fuel flowing. The absence of 12 volts DC causes shutdown.

A second method for effecting engine shutdown would be to interrupt voltage to the coil on a conventional spark ignition internal combustion engine.

A third method to effect shutdown is applicable to approximately fifty percent of all diesel engines. An electric air solenoid over air actuator is employed in such cases. The electric air solenoid corresponds to solenoid 732. The air actuator replaces a manual cable, similar to a choke cable, which the driver uses to start and turn off the vehicle. The actuator mechanically turns off the fuel at a point following the fuel pump.

OIL LEVEL MONITOR

Referring now to FIG. 8, depicted therein is circuitry for monitoring the oil level. Oil level sensor 802 is illustratively a Robertshaw Model 614 sensor which operates like the coolant level sensor discussed above. When sensor 802 is immersed in sufficient oil, a low signal is applied to lead 196, keeping the associated lamp in display unit 124 off. When switch 190 is closed, resistor 804 supplies bias to the circuitry. If the oil level now falls below the adequate level, the output of oil level sensor 802 allows the bias from resistor 804 to apply a high signal to lead 196, providing a visual display of low oil level. During the test mode, oil level sensor 802 is energized by system test circuit 186 applying a low signal to terminal 912.

At this point, it should be noted again that switches 190 and 192 (see FIG. 1) are part of the same switch assembly 188, illustratively a pushbutton switch body. Contacts 190 are closed before contacts 192 are closed. This allows the driver to check if his oil level is low. The driver may then push the switch in further to close contacts 192 to activate system test circuit 186.

SYSTEM TEST

Referring now to FIG. 9, depicted therein is illustrative circuitry for generating all the test signals previously mentioned. Before test button 192 is depressed, resistor 914 supplies a high voltage level to terminal 902. Terminal 902 is connected to the exhaust temperature monitor, the oil pressure monitor, the transmission temperature monitor, the engine temperature monitor, and the coolant level monitor, as previously described. When switch 192 is actuated, a low voltage level is applied to terminal 902, effecting the system test function. Terminal 906 is normally low, the high voltage supplied by resistor 904 being inverted by invertor 916. When switch 192 is actuated, the voltage at terminal 906 goes high. Terminal 906 is connected to the idle monitor circuit and the shutdown circuit. Terminal 908 is connected to the oil pressure monitor and is normally high. When switch 192 is actuated, terminal 908 goes low.

Terminal 904 is connected to the coolant level monitor and is normally floating. When switch 192 is actuated, transistor 918 is turned on, placing a ground on terminal 904. Terminal 912 is connected to the oil level sensor and is normally floating. When switch 192 is actuated, transistor 920 is turned on, placing a ground on terminal 912.

Terminal 922 is for connection to tachograph 122 to disable the tachograph during the test made and prevent the event stylus therein from marking the tachograph chart.

It is understood that the above-described arrangement is merely illustrative of the application of the principles of this invention. Numerous other arrangements may be devised by those skilled in the art without departing from the spirit and scope of this invention, as defined by the appended claims.

What is claimed is:

1. In an apparatus which functions in response to the occurrence of one or more adverse engine operating conditions for disabling a normally-energized switch controlling the operation of said engine, wherein said apparatus comprises:
    at least one sensing means coupled to said engine, each of said sensing means being responsive to a respective engine operating condition to provide a condition signal having a value which is indicative of said condition;
    at least one threshold detecting means, each of said threshold detecting means being coupled to receive the condition signal from a respective one of said sensing means and conditioned to provide a respective adverse condition signal when the value of the associated sensing means condition signal is within a predetermined range which indicates that the respective engine operating condition is adverse;
    indicating means coupled to said threshold detecting means and responsive to the presence of an adverse condition signal for providing an indication of said adverse condition;
    the improvement comprising:
    timing means coupled to said threshold detecting means and responsive to the continued presence of an adverse condition signal for timing a predetermined interval and providing an output signal at the termination of said interval;
    means responsive to said timing means output signal for disabling said engine; and
    manually operable switch means coupled to said timing means for restarting said timing means when said manually operable switch means is momentarily operated.

2. The apparatus according to claim 1 wherein said indicating means includes an audible warning device.

3. The apparatus according to claim 1 wherein said indicating means includes:
    at least one lamp; and
    at least one lamp driving means, each of said lamp driving means being connected between a respective one of said lamps and a respective one of said threshold detecting means for lighting said respective lamp when said respective threshold detecting means provides an adverse condition signal.

4. In an apparatus which functions in response to the occurrence of one or more adverse engine operating conditions for controlling the operations of said engine, wherein said apparatus comprises:
    at least one sensing means coupled through connecting circuitry to said engine, each of said sensing means being responsive to a respective engine operating condition to provide a condition signal having value which is indicative of said condition;
    at least one threshold detecting means, each of said threshold detecting means being coupled to receive the condition signal from a respective one of said sensing means and conditioned to provide a respective adverse condition signal when the value of the associated sensing means condition signal is within a predetermined range which indicates that the respective engine operating condition is adverse;
    indicating means coupled to said threshold detecting means and responsive to the presence of an adverse condition signal for providing an indication of said adverse condition;
    the improvement comprising:
    test means in circuit relation with said apparatus and selectively operable to provide simulated condition signals within the respective predetermined ranges which indicate respective adverse engine operating conditions, and to direct said signals to pass through said sensing means for testing the operativeness of said sensing means, said connected circuitry, and said threshold detecting means.

5. The combination in accordance with claim 4 in which said apparatus functions for disabling the operation of said engine;
    timing means coupled to said threshold detecting means and responsive to the continued presence of an actual or simulated adverse condition signal for timing a predetermined interval and for providing an output signal at the termination of said interval;

means responsive to said timing means output signal for disabling said engine.

6. The combination in accordance with claim 5 which comprises:

manually operable switch means coupled to said timing means for restarting said timing means when said manually operable switch means in momentarily operated.

7. The combination in accordance with claim 6 wherein:

said timing means comprises charge-storing means; and said means responsive to said timing means output signal for disabling said engine comprises a normally-operated switching means constructed to release when a preselected charge accumulates on said charge-storing circuit; and wherein said manually-operable switch comprises means momentarily operable to discharge and subsequently restart the charging cycle of said charge-storing means when said manually-operable switch is returned to its normal position.

8. The combination in accordance with claim 7 wherein said normally-operated switching means includes a solenoid connected to control the fuel supply to said engine.

9. The combination in accordance with claim 7 wherein:

said engine is an internal combustion engine; and said normally-operated switching means is connected in circuit relation with the coil in the spark-ignition circuit of said engine.

10. The apparatus in accordance with claim 5 wherein a tachograph is connected to at least one of said sensing means, said tachograph having an event stylus which is responsive to a predetermined signal on said sensing means to make a record on a tachograph chart; and means connected to said test means for disabling said tachograph to prevent said stylus from recording on said chart during the period of operation of said test means.

11. The apparatus according to claim 6 wherein said test means further includes means for preventing said timing means from timing said predetermined interval, during operation of said test means, thereby preventing engine disablement during a test.

12. The apparatus according to claim 5, further including:

idle sensing means responsive to vehicle idling for providing an idle signal;

means coupling said idle sensing means to said indicating means;

idle timer means responsive to said idle signal for timing a predetermined idle period; and means coupling said idle timer means to said timing means.

13. The apparatus according to claim 12 wherein said engine is mounted in a vehicle having a parking brake and said idle sensing means includes means responsive to engagement of the vehicle parking brake for providing said idle signal.

14. The apparatus according to claim 5 wherein one of said adverse engine operating conditions is low coolant level and the threshold detecting means corresponding to the coolant level condition includes coolant level timer means for providing the coolant level adverse condition signal only upon the persistence of a low coolant level condition signal for more than a predetermined time.

15. The apparatus according to claim 5 wherein one of said adverse engine operating conditions is engine oil pressure below a predetermined pressure level concurrently with engine speed above a predetermined speed level and the sensing means and threshold detecting means for said one condition include:

engine speed sensing means for providing a speed signal when engine speed is above said predetermined speed level;

oil pressure sensing means for providing an oil pressure signal when engine oil pressure is above said predetermined pressure level; and pressure timer means responsive to the presence of said speed signal and the absence of said oil pressure signal for timing a predetermined pressure interval, said pressure timer means providing a respective adverse condition signal at the termination of said predetermined pressure interval.

16. The apparatus according to claim 15 wherein said pressure timer means includes means for preventing termination of said respective adverse condition signal upon subsequent engine speed reduction.

17. The apparatus in accordance with claim 15 wherein said engine speed sensing means includes a tachometer;

said test means connected to an oscillator circuit responsive to a simulated condition signal provided by said test circuit to generate an oscillating signal and to inject said oscillating signal into said tachometer for simulating the speed signal derived from said tachometer during actual motion of said engine, when engine speed is above a predetermined speed level;

said pressure timer means being responsive to the presence of the speed signal from said tachometer and the absence of said oil pressure signal for timing said predetermined pressure interval.

18. The apparatus according to claim 4 wherein said engine is mounted in a vehicle having hazard lights, said apparatus further including means responsive to an adverse condition signal for actuating said hazard lights.

19. In an apparatus in accordance with claim 5 wherein said at least one sensing means includes a thermocouple mounted in the exhaust manifold of the engine, the output of said thermocouple being connected to threshold detecting means which responds to produce an output signal when the output of said thermocouple exceeds a preselected level; and said test means comprising means for injecting a signal through said thermocouple, the magnitude of which exceeds the maximum signal provided by said thermocouple, detecting said signal by said threshold detecting means and actuating said indicating means and said disabling means.

20. In an apparatus in accordance with claim 5 wherein said at least one sensing means is an engine transmission temperature sensor mounted in the transmission fluid associated with said engine; and said test means comprises means for applying a signal for changing the bias on said temperature sensor, whereby the output of said temperature sensor functions to over-ride the level of said threshold detecting means, for actuating said indicating means and disabling said normally-operated engine disabling switch.

21. In an apparatus in accordance with claim 5 wherein said at least one sensing means is a coolant level sensor comprising a high frequency oscillator in a bridge circuit connected to detect changes in impedance with and without said coolant, a timing circuit, means for applying the output of said coolant level sensor through said timing circuit to said threshold detecting means;

wherein said test means includes a source of low signal voltage simultaneously connected to energize said coolant level sensor and to accelerate the charging of said timing circuit for over-riding the threshold of said threshold-detecting means for actuating said indicating means and disabling said normally-operated engine disabling switch.

* * * * *

UNITED STATES PATENT AND TRADEMARK OFFICE
CERTIFICATE OF CORRECTION

PATENT NO. : 4,136,329

DATED : January 23, 1979

INVENTOR(S) : Joseph F. Trobert

It is certified that error appears in the above-identified patent and that said Letters Patent are hereby corrected as shown below:

In the Specification:

Column 1, line 7, delete "condition responsive" and substitute --condition-responsive--. Column 2, line 3, delete "the" and substitute --The--. Column 4, line 4, delete "cnndition" and substitute --condition--. Column 11, line 31, delete "904" and substitute --914--.

In the Drawings:

Fig. 1, insert --196-- and --184-- as indicated on the attached drawing.

Signed and Sealed this

Twenty-ninth Day of May 1979

[SEAL]

Attest:

RUTH C. MASON
Attesting Officer

DONALD W. BANNER
Commissioner of Patents and Trademarks